United States Patent
Karuppaswamy et al.

(10) Patent No.: US 11,148,632 B2
(45) Date of Patent: Oct. 19, 2021

(54) ROOF RAIL AIRBAG INCLUDING A VARIABLE-LENGTH TETHER ATTACHING AN EDGE OF THE ROOF RAIL AIRBAG TO A VEHICLE BODY STRUCTURE

(71) Applicant: GM GLOBAL TECHNOLOGY OPERATIONS LLC, Detroit, MI (US)

(72) Inventors: Senthil Karuppaswamy, Rochester Hills, MI (US); Naresh Kini, Bengaluru (IN); Pramod Joshi, Bengaluru (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 13 days.

(21) Appl. No.: 16/695,417

(22) Filed: Nov. 26, 2019

(65) Prior Publication Data
US 2021/0155199 A1 May 27, 2021

(51) Int. Cl.
*B60R 21/2338* (2011.01)
*B60R 21/213* (2011.01)

(52) U.S. Cl.
CPC ........ *B60R 21/2338* (2013.01); *B60R 21/213* (2013.01); *B60R 2021/23388* (2013.01)

(58) Field of Classification Search
CPC .............. B60R 21/2338; B60R 21/213; B60R 2021/23388
See application file for complete search history.

(56) References Cited

U.S. PATENT DOCUMENTS

| | | | | |
|---|---|---|---|---|
| 6,135,497 A * | 10/2000 | Sutherland | ............... | B60R 21/08 280/748 |
| 6,241,277 B1 * | 6/2001 | Heigl | .................... | B60R 21/232 280/730.2 |
| 6,308,982 B1 * | 10/2001 | Wallner | ................ | B60R 21/232 280/730.2 |
| 6,347,807 B1 * | 2/2002 | Schink | .................. | B60R 21/232 280/730.2 |
| 6,464,250 B1 * | 10/2002 | Faigle | ................... | B60R 21/232 280/730.2 |
| 7,748,741 B2 * | 7/2010 | Mitchell | ............... | B60R 21/213 280/743.2 |
| 2002/0175502 A1 * | 11/2002 | Tesch | .................. | B60R 21/2338 280/730.2 |
| 2004/0140653 A1 * | 7/2004 | Bossecker | ........... | B60R 21/2338 280/730.2 |
| 2008/0106073 A1 * | 5/2008 | Garner | .................. | B60R 21/213 280/728.2 |
| 2020/0180513 A1 * | 6/2020 | Andrus | ................. | B60P 7/0846 |

* cited by examiner

*Primary Examiner* — Drew J Brown
(74) *Attorney, Agent, or Firm* — Harness, Dickey & Pierce, P.L.C.

(57) ABSTRACT

An airbag assembly according to the present disclosure includes an airbag cushion and a first tether. The airbag cushion is configured to be stored in a roof of a vehicle when the airbag cushion is uninflated. The airbag cushion is configured to at least partially cover an opening in a sidewall of the vehicle when the airbag cushion is inflated. The first tether is coupled to a forward edge of the airbag cushion at a first location. The first tether is configured to be coupled to a body of the vehicle at a second location. A length of the first tether between the first and second locations is configured to vary as the airbag cushion is deployed.

17 Claims, 6 Drawing Sheets

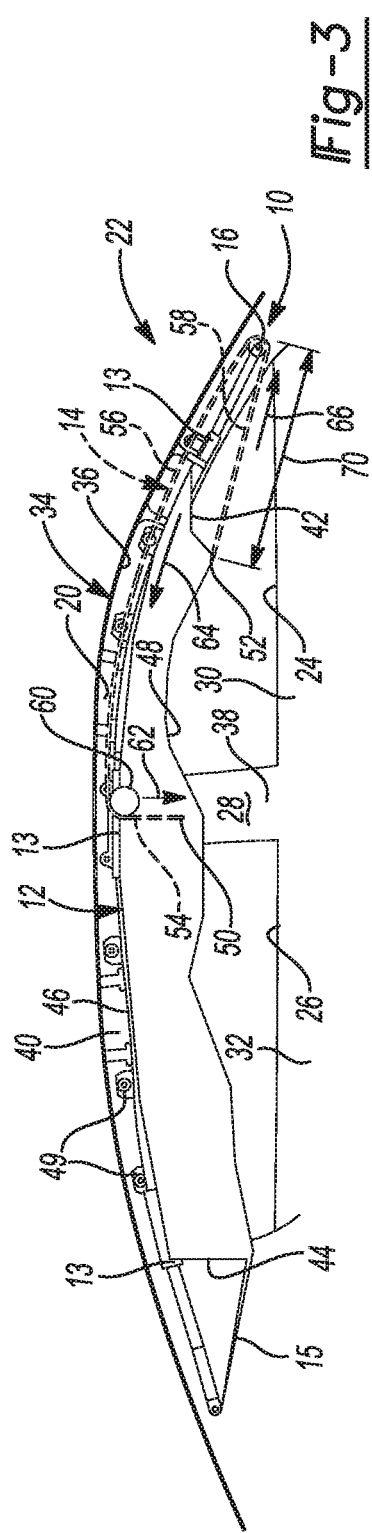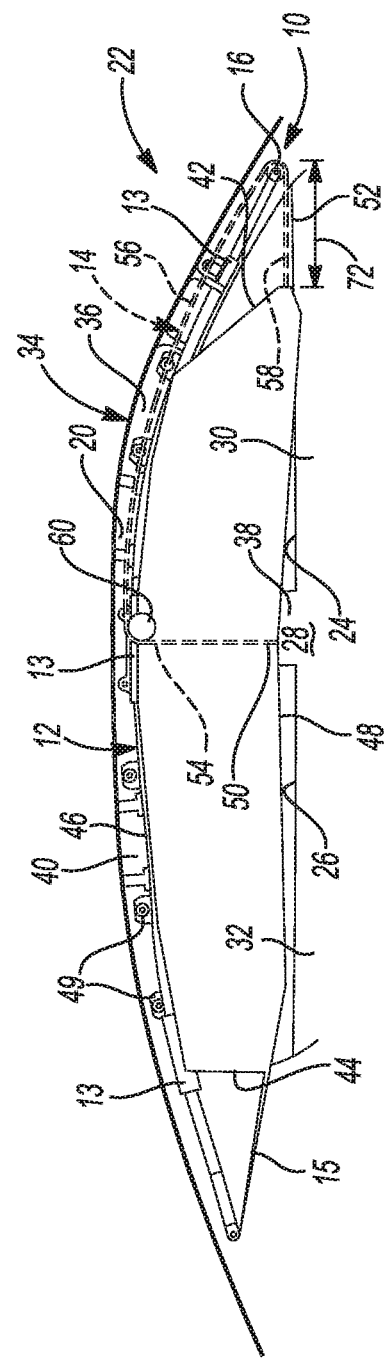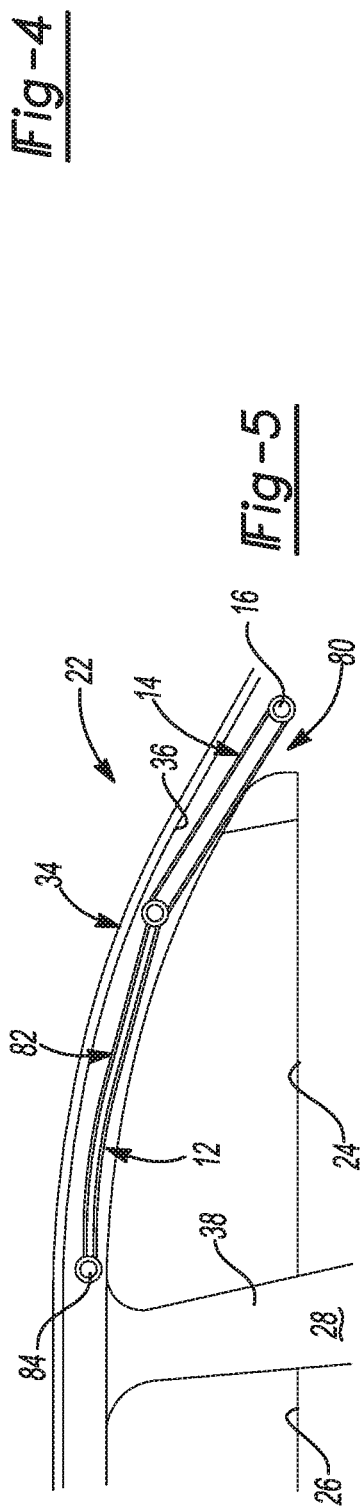

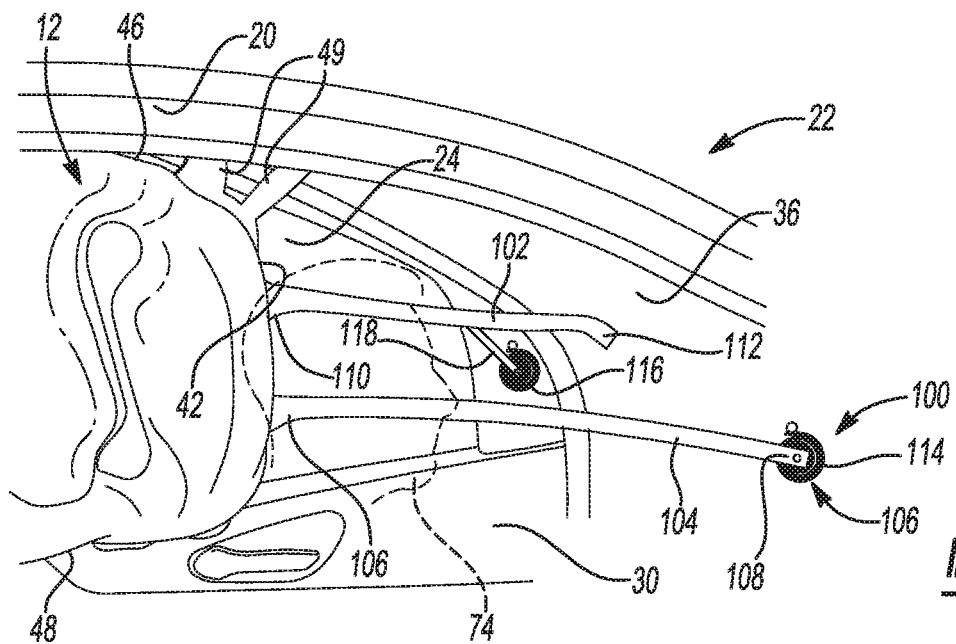
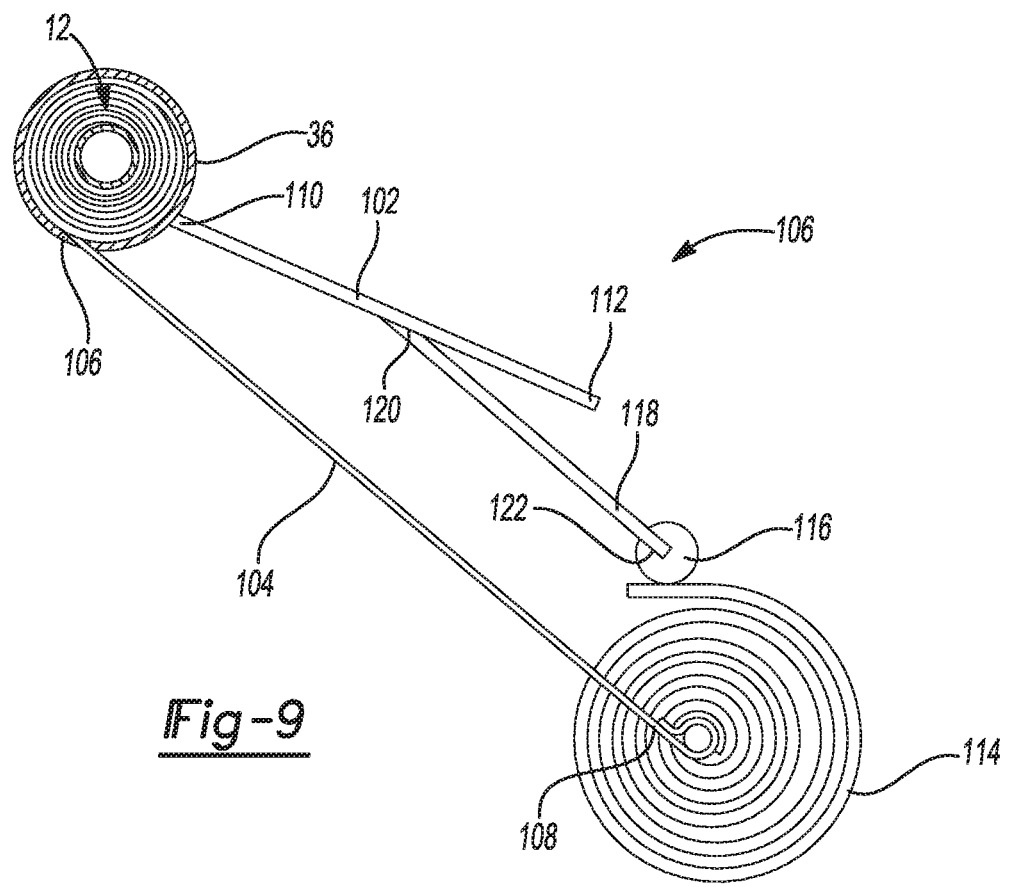

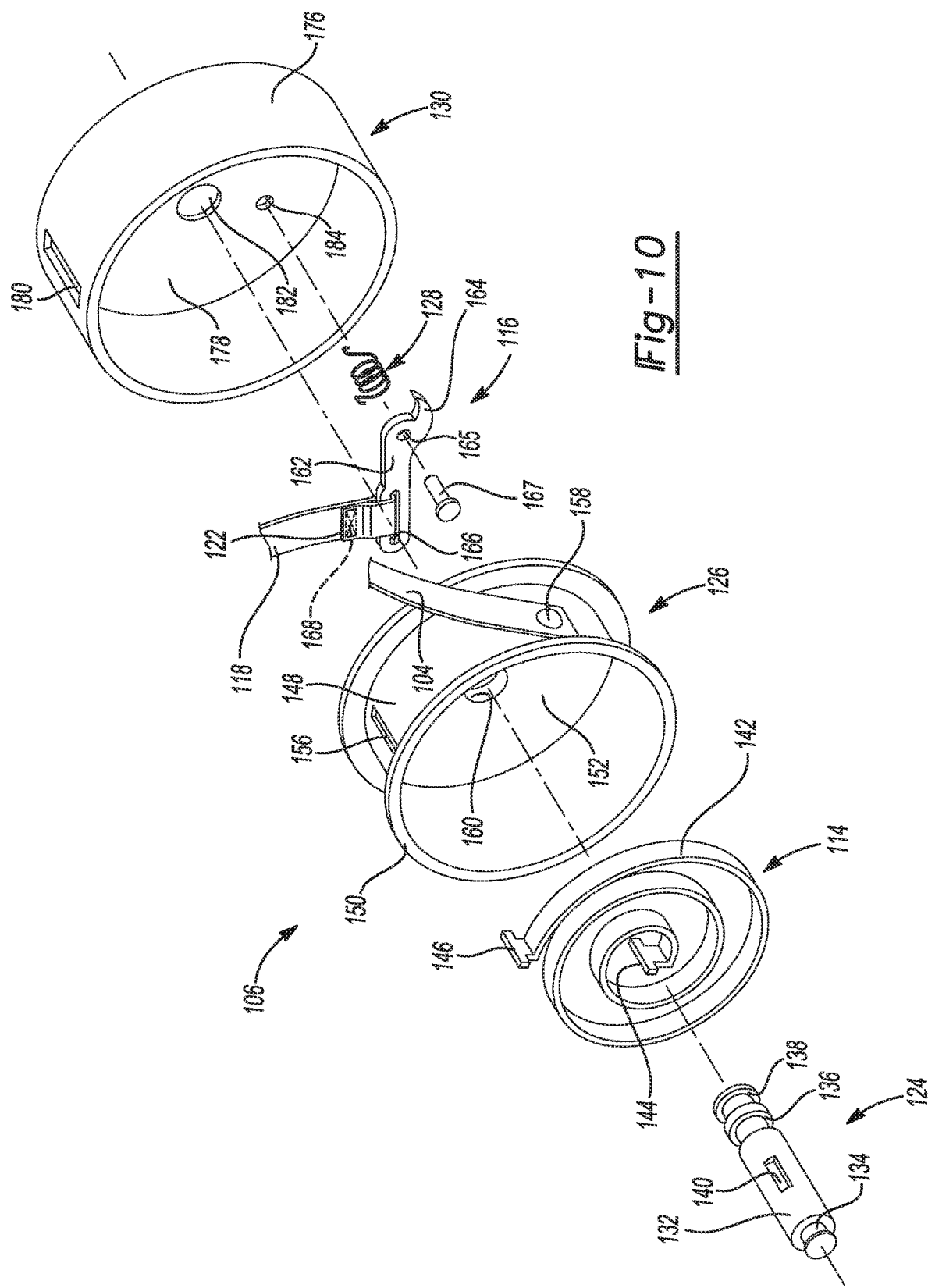

ROOF RAIL AIRBAG INCLUDING A VARIABLE-LENGTH TETHER ATTACHING AN EDGE OF THE ROOF RAIL AIRBAG TO A VEHICLE BODY STRUCTURE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to roof rail airbags including a variable-length tether attaching an edge of the roof rail airbags to a vehicle body structure.

Roof rail airbags are stored in a roof rail of a vehicle and deploy downward to cover an interior surface of a sidewall of the vehicle. The roof rail of a vehicle is typically formed by an A-pillar of the vehicle and a C-pillar of a vehicle. The portion of the sidewall of a vehicle that is covered by a roof rail airbag typically includes a B-pillar of the vehicle, a front window opening of the vehicle, and a rear window opening of the vehicle.

Roof rail airbags are typically designed to protect an occupant in a vehicle in the event that the vehicle is involved in a side impact. In some vehicles, a roof rail airbag may be designed to mitigate the possibility that an occupant may be ejected from the vehicle. Roof rail airbags designed for ejection mitigation are sufficiently stiff to contain an occupant that impacts the airbag without any external backing barrier or pole behind portions of the roof rail airbag (e.g., portions covering window openings). Thus, roof rail airbags designed for ejection mitigation are typically wider, taller, and stronger than roof rail airbags designed from side impacts alone.

SUMMARY

An airbag assembly according to the present disclosure includes an airbag cushion and a first tether. The airbag cushion is configured to be stored in a roof of a vehicle when the airbag cushion is uninflated. The airbag cushion is configured to at least partially cover an opening in a sidewall of the vehicle when the airbag cushion is inflated. The first tether is coupled to a forward edge of the airbag cushion at a first location. The first tether is configured to be coupled to a body of the vehicle at a second location. A length of the first tether between the first and second locations is configured to vary as the airbag cushion is deployed.

In one example, the first tether is configured to remain taught as the length of the first tether between the first and second location varies.

In one example, the length of the first tether between the first and second location decreases as the airbag cushion is deployed.

In one example, the first location is adjacent to a lower edge of the airbag cushion, and the second location is on an A-pillar of the vehicle.

In one example, the airbag assembly further includes a first spool attached to the A-pillar of the vehicle at the first location. The first tether has a first end attached to the lower edge of the airbag cushion at a third location and a second end attached to the forward edge of the airbag cushion at the first location. The first tether extends from the lower edge of the airbag cushion to the A-pillar, extends along the A-pillar and at least partially around the first spool, and extends from the first spool to the forward edge of the airbag cushion.

In one example, the first tether includes a first segment, a second segment, and a third segment. The first segment extends between the A-pillar and the lower edge of the airbag cushion. The second segment extends along the A-pillar between the first and third segments. The third segment extends between the first spool and the forward edge of the airbag cushion.

In one example, when the airbag cushion is deployed, the airbag cushion exerts a downward force on the first segment of the first tether, which in turn exerts a rearward force on the second segment of the first tether and a forward force on the third segment of the first tether.

In one example, the first segment of the first tether extends vertically along a B-pillar of the vehicle when the airbag cushion is inflated.

In one example, the airbag assembly further includes a second spool attached to the A-pillar at a fourth location that is rearward of the third location. The first segment of the first tether extends along the forward edge of the airbag cushion between the second spool and the lower edge of the airbag cushion. The second segment of the first tether extends along the A-pillar between the first and second spools.

In one example, the airbag assembly further includes a plurality of guides attached to the airbag cushion along the forward edge of the airbag cushion. The first segment of the first tether passes through the plurality of guides.

In one example, the airbag assembly further includes a second tether and a third spool. The third spool is attached to the A-pillar at a fifth location that is rearward of the fourth location. The second tether extends from the lower edge of the airbag cushion to the third spool, extends at least partially around the third spool, and extends from the third spool to the forward edge of the airbag cushion.

In one example, the airbag assembly further includes a plurality of guides attached to the airbag cushion at locations along a B-pillar of the vehicle when the airbag cushion is inflated. The second tether passes through the plurality of guides.

In one example, the airbag assembly further includes a tensioning mechanism that applies tension to the first tether and thereby removes slack from the first tether as the airbag cushion is deployed.

In one example, the tensioning mechanism attaches the first tether to an A-pillar of the vehicle at the second location.

In one example, the airbag assembly further includes a second tether attached to the forward edge of the airbag cushion at a third location and attached to the A-pillar at a fourth location. The third and fourth locations are higher than the first and second location, and the fourth location is rearward of the second location.

In one example, a length of the second tether between the third and fourth locations is fixed.

In one example, the tensioning mechanism includes a clock spring, a spring restraint, and a third tether. The clock spring couples the first tether to the A-pillar at the second location. The spring restraint is configured to constrain the clock spring to prevent the clock spring from unwinding. The third tether couples the second tether to the spring restraint. When the airbag cushion is deployed, the airbag cushion pulls the second tether rearward, which pulls the third tether rearward and thereby releases the spring restraint. Releasing the spring restraint allows the clock spring to unwind and thereby applies tension to the first tether.

A vehicle according to the present disclosure includes an A-pillar, a sidewall, an airbag cushion, and a tether. The sidewall is disposed below the A-pillar. The airbag cushion is configured to be stored in the A-pillar when the airbag cushion is uninflated. The airbag cushion is configured to at least partially cover an opening in the sidewall when the airbag cushion is inflated. The tether is coupled to a forward edge of the airbag cushion at a first location. The tether is coupled to the A-pillar at a second location. A length of the tether between the first and second locations is configured to vary as the airbag cushion is deployed.

In one example, the length of the tether between the first and second location decreases as the airbag cushion is deployed.

In one example, the tether is configured to remain taught as the length of the tether between the first and second location decreases.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 is a side view of the airbag assembly of FIG. 1 when the airbag cushion of the airbag assembly is partially inflated;

FIG. 4 is a side view of the airbag assembly of FIG. 1 when the airbag cushion of the airbag assembly is fully inflated;

FIG. 5 is a side view of a second example of an airbag assembly according to the present disclosure, the airbag assembly including an airbag cushion shown in an uninflated state;

FIG. 8 is a side view of the airbag assembly of FIG. 7 when the airbag cushion of the airbag assembly is fully inflated;

FIG. 9 is a side view of a tensioning mechanism included in the airbag assembly of FIG. 7;

FIG. 10 is an exploded perspective view of an example implementation of the tensioning mechanism of FIG. 9.

In the drawings, reference numbers may be reused to identify similar and/or identical elements.

DETAILED DESCRIPTION

Figure 1:
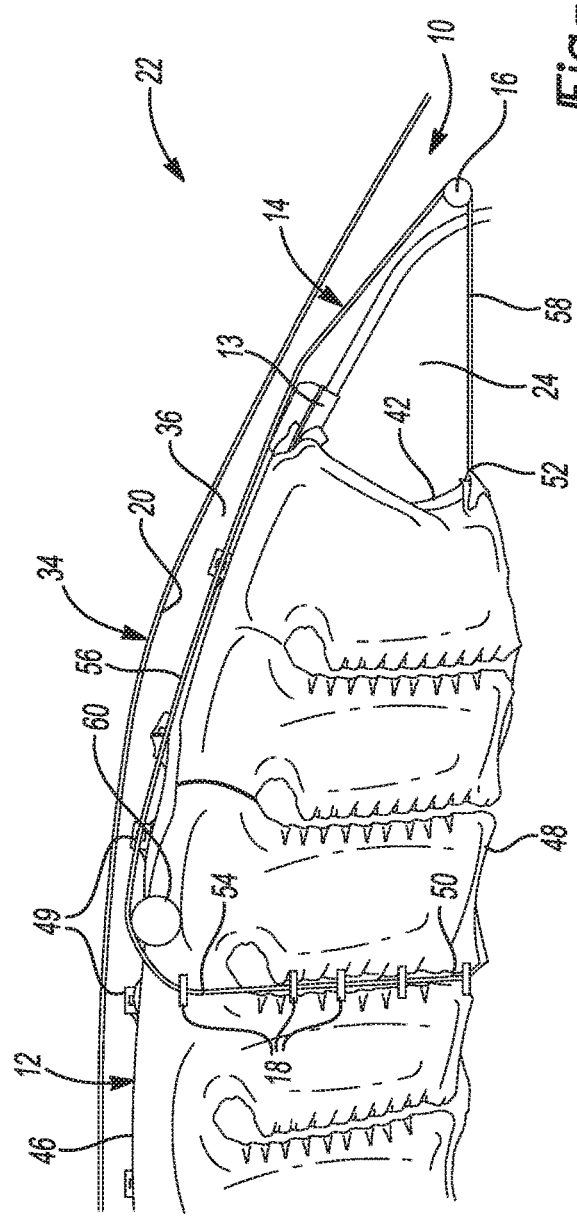
FIG. 1 is a side view of a first example of an airbag assembly according to the present disclosure.

In some cases, it may be a challenge to make a roof rail airbag stiff enough to contain an occupant that impacts the airbag without any external backing barrier or pole behind portions of the airbag. This challenge is exasperated by vehicles with large window openings, such as sport utility vehicles with high belt lines. To address this challenge, a roof rail airbag assembly may include a tether that extends in the fore-aft direction and attaches a front edge of the roof rail airbag to the A-pillar. However, compromises may be made in the placement of the tether, and therefore the stiffness provided by the tether, to avoid interfering with the deployment kinematics of the roof rail airbag.

For example, it may be desirable to attach the tether to the front edge of the roof rail airbag near the bottom edge thereof to provide the desired stiffness. However, if the tether is attached to the front edge of the roof rail airbag near the bottom edge thereof, the tether may interfere with deployment of the roof rail airbag if the tether is too short. In addition, if the length of the tether is increased to avoid interfering with the deployment kinematics of the roof rail airbag, the tether may not provide the desired stiffness as the tether may not be taught when the roof rail airbag is deployed. Thus, the tether may be attached the front edge of the roof rail airbag at a location that is significantly higher than the bottom edge of the airbag. Such compromises may limit the amount of stiffness provided by the airbag assembly.

A roof rail airbag assembly according to the present disclosure includes a tether that extends in the fore-aft direction and couples the front edge of a roof rail airbag to an A-pillar, and the length of the tether is configured to vary as the airbag is deployed. The assembly includes features that remove slack from the tether as the airbag is deployed so that the tether may be attached to the front edge of the airbag near the bottom edge thereof without interfering with the deployment kinematics of the airbag. In turn, the stiffness provided by the assembly may be maximized.

In one example, the tether extends from the front edge of the airbag to a first spool fixed to the A-pillar, extends along the A-pillar from the first spool to a second spool fixed to the A-pillar, and extends downward from the second spool to the bottom edge of the airbag. One end of the tether is fixed to the bottom edge of the airbag, and the other end of the tether is fixed to the front edge of the airbag. In turn, when the airbag is deployed, the airbag pulls down on the one end of the tether, which causes the tether to pull forward on the front edge of the airbag. Thus, in this example, the deployment force of the roof rail airbag is used to apply tension to the tether and thereby remove slack from the tether as the airbag is deployed.

In another example, the assembly includes upper and lower tethers that each couple the front edge of the airbag to the A-pillar, and a tensioning mechanism that attaches the lower tether to the A-pillar while applying tension to the lower tether. The tensioning mechanism includes a clock spring, a spring restraint, and a triggering tether. The clock spring applies tension to the lower tether when the clock spring unwinds. The spring restraint prevents the clock spring from unwinding when the spring restraint is engaged. The triggering tether couples the spring restraint to the upper tether so that the spring restrain is release when the airbag is deployed, which allows the clock spring to unwind and thereby applies tension to the lower tether. Thus, in this example, the tensioning mechanism is used to apply tension to the tether and thereby remove slack from the tether as the airbag is deployed.

Figure 2:
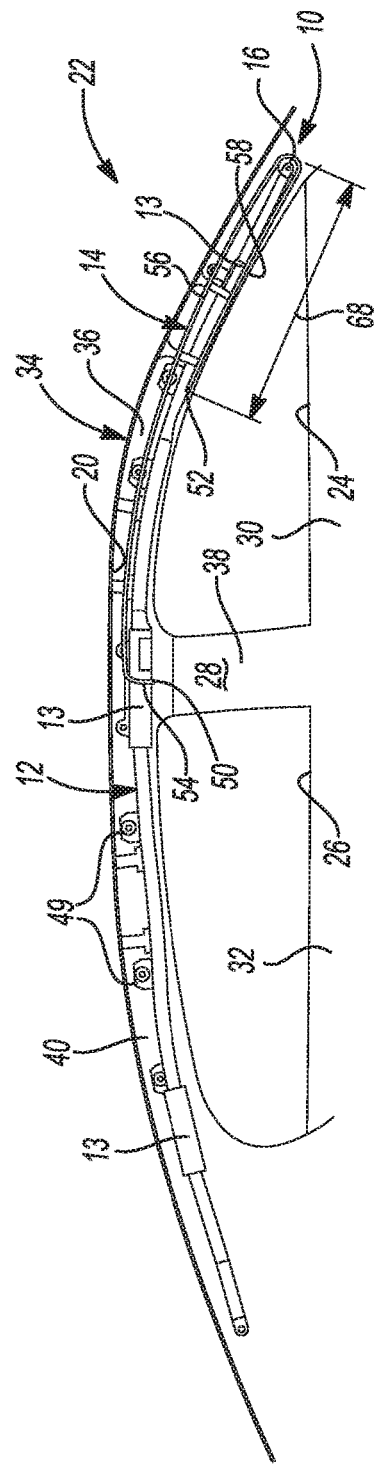
FIG. 2 is a side view of the airbag assembly of FIG. 1 when an airbag cushion of the airbag assembly is uninflated.

Referring now to FIGS. 1-4, an airbag assembly 10 includes an airbag cushion 12, one or more inflators 13, a front tether 14, a rear tether 15, a spool 16, and a plurality of guides 18. The airbag cushion 12 is configured to be stored (e.g., rolled up) in a roof rail 20 of a vehicle 22 when the airbag cushion 12 is uninflated as shown in FIG. 2. The airbag cushion 12 is configured to cover a majority of a front window opening 24 in a sidewall 28 of the vehicle 22 and a rear window opening 26 in the sidewall 28 when the airbag cushion 12 is inflated as shown in FIG. 4. In the example shown, the sidewall 28 is formed by and/or part of a front door 30 of the vehicle 22 and a rear door 32 of the vehicle 22. In other examples, the sidewall 28 is part of a body structure 34 of the vehicle 22 that includes an A-pillar 36, a B-pillar 38, and a C-pillar 40. The A-pillar 36 and the C-pillar 40 form the roof rail 20.

The airbag cushion 12 has a forward edge 42, a rearward edge 44, an upper edge 46, and a lower edge 48. The front tether 14 couples the forward edge 42 of the airbag cushion 12 to the A-pillar 36 of the vehicle 22. The rear tether 15 couples the rearward edge 44 of the airbag cushion 12 to the C-pillar 40 of the vehicle 22. The airbag cushion 12 includes a plurality of mounting tabs 49 disposed along the upper edge 46 thereof. Fasteners may be inserted through the mounting tabs 49 to secure the airbag cushion 12 to the A-pillar 36. The airbag cushion 12 may be formed from a fabric.

The inflators 13 are operable to deploy the airbag cushion 12 from an uninflated state (FIG. 2) to a fully inflated state (FIGS. 1 and 4). Each of the inflators 13 may include an igniter and a propellant. When the vehicle 22 is involved in an impact, the igniter combusts the propellant, which produces an inert gas and thereby inflates the airbag cushion 12.

The front tether 14 has a first end 50 and a second end 52 opposite of the first end 50. The first end 50 of the front tether 14 is attached (e.g., stitched) to the lower edge 48 of the airbag cushion 12. The second end 52 of the front tether 14 is attached (e.g., stitched) to the forward edge 42 of the airbag cushion 12. The front tether 14 extends from the lower edge 48 of the airbag cushion 12 to the A-pillar 36, extends along the A-pillar 36 and at least partially around the spool 16, and extends from the spool 16 to the forward edge 42 of the airbag cushion 12. In various implementations, the airbag assembly 10 includes a spool 60 fixed to the A-pillar 36 above the B-pillar 38, and the front tether 14 wraps around the spool 60. The front tether 14 may be a cable or strap and/or may be formed (e.g., braided, woven) from plastic (e.g., nylon) or metal (e.g., steel).

The front tether 14 includes a first segment 54, a second segment 56, and a third segment 58. When the airbag cushion 12 is inflated, the first segment 54 of the front tether 14 extends vertically along the B-pillar 38 from the lower edge 48 of the airbag cushion 12 to the A-pillar 36 (e.g., to the spool 60). The second segment 56 of the front tether 14 extends along the A-pillar 36 from the first segment 54 (e.g., from the spool 60) to the spool 16. The third segment 58 of the front tether 14 extends from the spool 16 to the forward edge 42 of the airbag cushion 12.

The rear tether 15 has a fixed length. The rear tether 15 may be formed integral with the airbag cushion 12, in which case the rear tether 15 may be formed from the same material as the airbag cushion 12. Alternatively, the rear tether 15 may be formed separate from the airbag cushion 12 and attached thereto, in which case the rear tether 15 may be formed from a different material than the airbag cushion 12. For example, the rear tether 15 may be formed from plastic or metal.

The spools 16, 60 are fixed (e.g., fastened) to the A-pillar 36. The spools 16, 60 may include a roller, pulley, or guide tube. The spools 16, 60 secure the front tether 14 to the A-pillar 36 while allowing the front tether 14 to move around the spools 16, 60. In various implementations, the spool 60 may be omitted.

The guides 18 may be hooks or loops through which the front tether 14 extends. The guides 18 maintain a desired routing of the front tether 14 as the front tether 14 slides through the guides 18 during deployment of the airbag cushion 12. The guides 18 may be formed from plastic or metal.

With continued reference to FIGS. 1-4, operation of the airbag assembly 10 will now be described. When the airbag cushion 12 is uninflated as shown in FIG. 2, the front tether 14 extends along the A-pillar 36 from the B-pillar 38 to the spool 16, extends partially around the spool 16, and is routed back through the A-pillar 36. The front tether 14 may be routed through a captive routing tube in the A-pillar 36.

When the airbag cushion 12 is deployed as shown in FIGS. 2 and 3, the airbag cushion 12 expands from the roof rail 20 in a downward direction 62 to at least partially cover the front and rear window openings 24 and 26. Consequently, the airbag cushion 12 exerts a force in the downward direction 62 on the first segment 54 of the front tether 14, which pulls the first end 50 of the front tether 14 in the downward direction 62. In turn, the first segment 54 of the front tether 14 exerts a force in a rearward direction 64 on the second segment 56 of the front tether 14, which pulls the second segment 56 of the front tether 14 in the rearward direction 64. As a result, the second segment 56 exerts a force in a forward direction 66 on the third segment 58 of the front tether 14, which pulls the second end 52 of the front tether 14 in the forward direction 66.

Thus, when the airbag cushion 12 is deployed, the length of the first segment 54 of the front tether 14 increases, the length of the second segment 56 of the front tether 14 stays the same, and the length of the third segment 58 of the front tether 14 decreases. For example, the third segment 58 has a first length 68 when the airbag cushion 12 is uninflated as shown in FIG. 2, the third segment 58 has a second length 70 when the airbag cushion 12 is partially inflated as shown in FIG. 3, and the third segment 58 has a third length 72 when the airbag cushion 12 is fully inflated as shown in FIG. 4. The second length 70 is less than the first length 68, and the third length 72 is less than the second length 70. In addition, due to the force applied to the front tether 14 by the airbag cushion 12 during its deployment, the front tether 14 remains taught during deployment of the airbag cushion 12.

When the airbag cushion 12 is fully inflated as shown in FIG. 4, the first end 50 of the front tether 14 is disposed at or near the bottom of the B-pillar 38, and the second end 52 of the front tether 14 is disposed at or near the A-pillar 36. As a result, the airbag cushion 12 covers a majority of the front window opening 24. Thus, the force of deploying the airbag cushion 12 is transmitted to the forward edge 42 of the airbag cushion 12 via the front tether 14 to pull the forward edge 42 in the forward direction 66 and thereby cover a majority of the front window opening 24.

If a head 74 (FIG. 8) of an occupant within the vehicle 22 impacts the airbag cushion 12, the force of the occupant impacting the airbag cushion 12 is transferred through the front tether 14 and is applied to the forward edge 42 of the airbag cushion 12 in the forward direction 66. In this manner, the front tether 14 holds the forward edge 42 in place and thereby contains the occupant within the vehicle 22 even when the occupant impacts the airbag cushion 12 near the forward edge 42 of the airbag cushion 12. In addition, since the length of the third segment 58 of the front tether 14 is configured to vary, the second end 52 of the front tether 14 can be attached to the forward edge 42 of the airbag cushion 12 at a lower location without inhibiting deployment of the airbag cushion 12. Thus, when the head of the occupant impacts the airbag cushion 12 near the corner thereof where the forward and lower edges 42 and 48 meet, the front tether 14 holds that corner in place and thereby contains the occupant within the vehicle 22. The lower attachment of the second end 52 of the front tether 14 to the forward edge 42 of the airbag cushion 12 also improves the deployment kinematics of the airbag cushion 12. For example, when the airbag cushion 12 is deployed, the front tether 14 is less likely to pull the airbag cushion 12 through the front window opening 24 of the vehicle 22.

Figure 6:
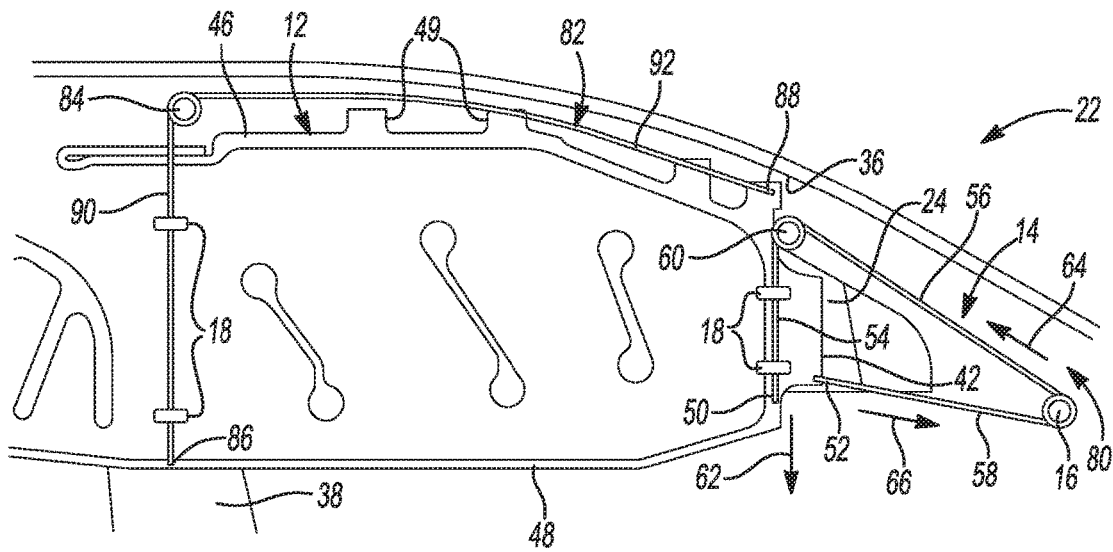
FIG. 6 is a side view of the airbag assembly of FIG. 5 when the airbag cushion of the airbag assembly is fully inflated.

Referring now to FIGS. 5 and 6, an airbag assembly 80 is similar to the airbag assembly 10 except that the front tether 14 is routed differently, and the airbag assembly 80 further includes a middle tether 82 and a spool 84. In the airbag assembly 80, the first segment 54 of the front tether 14 is adjacent to and extends along the forward edge 42 of the airbag cushion 12. In addition, the guides 18 through which the first segment 54 extends are also disposed adjacent to and along the forward edge 42 of the airbag cushion 12.

The middle tether 82 has a first end 86 and a second end 88 opposite of the first end 86. The first end 86 of the middle tether 82 is attached (e.g., stitched) to the airbag cushion 12 at or near the lower edge 48 thereof. The second end 88 of the middle tether 82 is attached (e.g., stitched) to the airbag cushion 12 at or near the corner of the airbag cushion 12 where its forward and upper edges 42 and 46 meet. The middle tether 82 may be a cable or strap and/or may be formed (e.g., braided, woven) from plastic (e.g., nylon) or metal (e.g., steel).

The middle tether 82 includes a first segment 90 and a second segment 92. The first segment 90 of the middle tether 82 extends from the first end 86 thereof to the spool 84. When the airbag cushion 12 is inflated as shown in FIG. 6, the first segment 90 of the middle tether 82 extends vertically along the B-pillar 38 and through the guides 18 attached to the airbag cushion 12 and disposed along the B-pillar 38. The second segment 92 of the middle tether 82 extends along the A-pillar 36 from the spool 84 to the second end 88 of the middle tether 82. The spool 84 is fixed (e.g., fastened) to the A-pillar 36 above the B-pillar 38.

The spools 84 is fixed (e.g., fastened) to the A-pillar 36. The spool 84 may include a roller, pulley, or guide tube. The spool 84 secure the middle tether 82 to the A-pillar 36 while allowing the middle tether 82 to move around the spool 84.

Operation of the airbag assembly 80 is similar to operation of the airbag assembly 10. When the airbag cushion 12 is uninflated as shown in FIG. 5, the airbag cushion 12 is stowed (e.g., rolled up) in the A-pillar 36 of the vehicle 22. In this condition, the length of the first segment 54 of the front tether 14 may be limited or minimized, while the second segment 56 of the front tether 14 may have slack. The slack in the second segment 56 of the front tether 14 ensures that the front tether 14 does not interfere with the deployment kinematics of the airbag cushion 12.

When the airbag cushion 12 is deployed as shown in FIG. 6, the airbag cushion 12 expands from the roof rail 20 in the downward direction 62 to at least partially cover the front and rear window openings 24 and 26. Consequently, the airbag cushion 12 applies a force to the first segment 54 of the front tether 14 in the downward direction 62, which causes the first end 50 of the front tether 14 to move in the downward direction 62. In turn, the first segment 54 of the front tether 14 pulls the second segment 56 of the front tether 14 in the rearward direction 64, and the second segment 56 of the front tether 14 pulls the third segment 58 of the front tether 14 in the forward direction 66. As this occurs, the front tether 14 is pulled around and/or through the spools 16, 60.

This movement of the front tether 14 around and/or through the spools 16, 60 eliminates the slack in the front tether 14. In addition, the deployment force of the airbag cushion 12 is transmitted to the forward edge 42 of the airbag cushion 12 through the front tether 14 and thereby pulls the forward edge 42 of the airbag cushion 12 in the forward direction 66. As a result, the airbag cushion 12 covers the majority of the front window opening 24.

Furthermore, the front tether 14 and the middle tether 82 increase the stiffness or structural rigidity of the airbag cushion 12. In turn, if the head of an occupant within the vehicle 22 impacts the airbag cushion 12, the front tether 14 and the middle tether 82 hold the airbag cushion 12 in the position shown in FIG. 6 during the impact. As a result, the airbag cushion 12 prevents the occupant from passing through the front window opening 24 or impacting the body structure 38.

Figure 7:
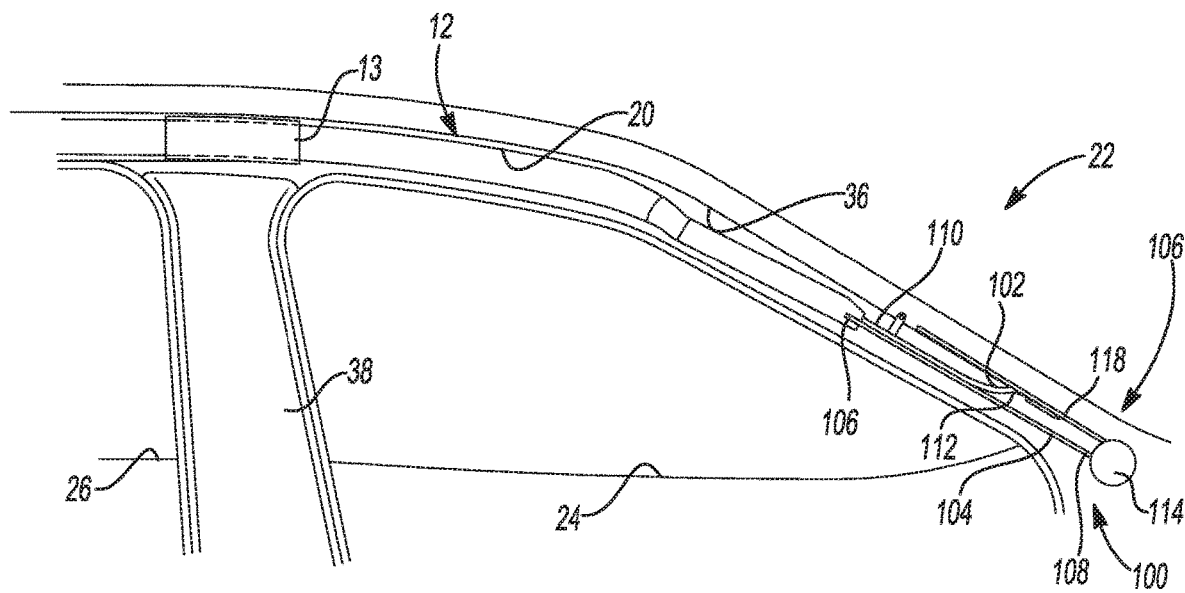
FIG. 7 is a side view of a third example of an airbag assembly according to the present disclosure, the airbag assembly including an airbag cushion shown in an uninflated state.

Referring now to FIGS. 7-9, an airbag assembly 100 includes the airbag cushion 12, an upper front tether 102, a lower front tether 104, and a tensioning mechanism 106. Each of the upper and lower front tethers 102 and 104 couple the forward edge 42 of the airbag cushion 12 to the A-pillar 36. However, the upper front tether 102 has a fixed length, while the length of the lower front tether 104 may vary as the airbag cushion 12 is deployed. Each of the upper and lower front tethers 102 and 104 may be a cable or strap and/or may be formed (e.g., braided, woven) from plastic (e.g., nylon) or metal (e.g., steel).

The lower front tether 104 has a first end 107 and a second end 108 opposite of the first end 107. The first end 107 of the lower front tether 104 is attached to the forward edge 42 of the airbag cushion 12 at a first location, and the second end 108 of the lower front tether 104 is attached to the A-pillar 36 at a second location. Due to tension applied to the lower front tether 104 by the tensioning mechanism 106, the length of the lower front tether 104 between the first and second ends 106 and 108 (or between the first and second locations) decreases as the airbag cushion 12 is deployed.

The upper front tether 102 has a first end 110 and a second end 112 opposite of the first end 110. The first end 110 of the upper front tether 102 is attached to the forward edge 42 of the airbag cushion 12 at a third location, and the second end 112 of the upper front tether 102 is attached to the A-pillar 36 at a fourth location. The third and fourth locations are higher than the first and second locations, respectively, and the fourth location is rearward of the second location. The length of the upper front tether 102 between the first and second ends 110 and 112 (or between the third and fourth locations) remains constant as the airbag cushion 12 is deployed.

The tensioning mechanism 106 attaches the lower front tether 104 to the A-pillar 36 at the second location. In addition, the tensioning mechanism 106 applies tension to the lower front tether 104 and thereby removes slack from the lower front tether 104 as the airbag cushion 12 is deployed. Further, the tensioning mechanism 106 decreases the length of the lower front tether 104 between the first and second locations as the airbag cushion 12 is deployed by removing (e.g., reeling in) slack in the lower front tether 104.

As best shown in FIG. 9, the tensioning mechanism 106 includes a clock spring 114, a spring restraint 116, and a triggering tether 118. The clock spring 114 couples the second end 108 of the lower front tether 104 to the A-pillar 36 at the second location. In addition, the clock spring 114 applies tension to the lower front tether 104 and removes slack from the lower front tether 104 when the clock spring 114 unwinds. The clock spring 114 may be indirectly attached to the lower front tether 104 and the A-pillar 36 through other components that cause the clock spring 114 to tension the lower front tether 104 as the clock spring 114 unwinds. The spring restraint 116 constrains the clock spring 114 to prevent the clock spring 114 from unwinding when the spring restraint 116 is engaged. The spring restraint 116 allows the clock spring 114 to unwind when the spring restraint 116 is released.

The triggering tether 118 couples the upper front tether 102 to the spring restraint 116. The triggering tether 118 has a first end 120 and a second end 122 opposite of the first end 120. The first end 120 of the triggering tether 118 is attached (e.g., tied, fastened, adhered) to the upper front tether 102 at a location between the first and second ends 110 and 112 of the upper front tether 102. The triggering tether 118 may be a cable or strap and/or may be formed (e.g., braided, woven) from plastic (e.g., nylon) or metal (e.g., steel).

With continued reference to FIGS. 7-9, operation of the airbag assembly 100 will now be described. When the airbag cushion 12 is uninflated as shown in FIG. 7, each of the upper and lower front tethers 102 and 104 extend along the A-pillar 36 and are disposed within the roof rail 120. In addition, the spring restraint 116 constrains the clock spring 114 to prevent the clock spring 114 from unwinding. When the airbag cushion 12 is deployed as shown in FIG. 8, the airbag cushion 12 pulls the upper front tether 102 rearward, which pulls the triggering tether 118 rearward and thereby releases the spring restraint 116. In turn, the clock spring 114 unwinds and thereby applies tension to the lower front tether 104.

Figure 11:
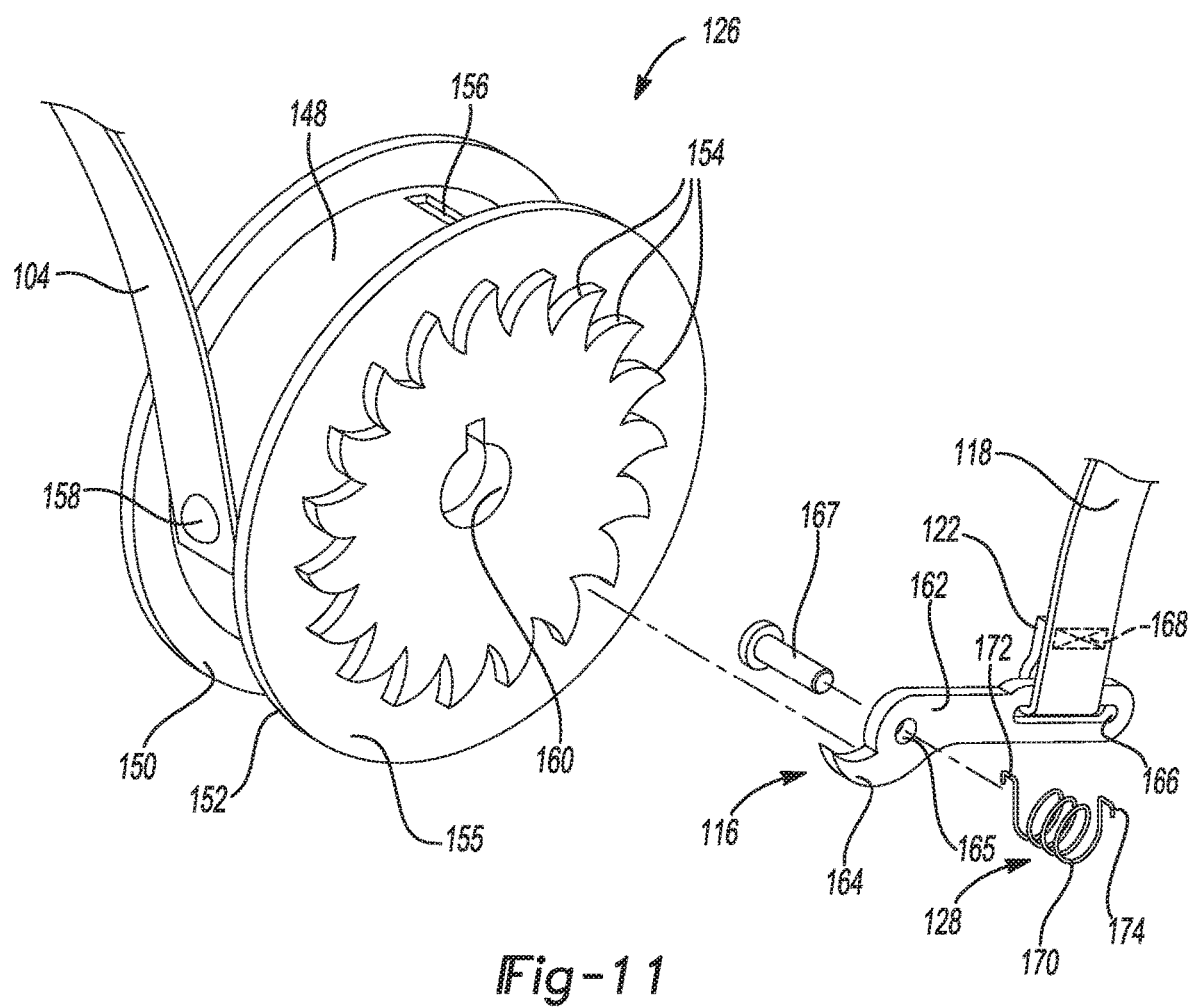
FIG. 11 is another exploded perspective view of a portion of the example implementation of the tensioning mechanism of FIG. 9.

Referring now to FIGS. 10 and 11, an example implementation of the tensioning mechanism 106 includes a spindle 124, the clock spring 114, an inner housing 126, the spring restraint 116, the triggering tether 118, a coil spring 128, and an outer housing 130. The spindle 124 includes a cylindrical body 132 that defines a first annular groove 134, a second annular groove 136, a third annular groove 138, and an annular slot 140. The annular slot 140 extends completely through the cylindrical body 132 of the spindle 124. The spindle 124 may be formed (e.g., molded, casted, forged, and/or machined) from plastic and/or metal.

The example implementation of the clock spring 114 shown in FIG. 10 includes a spring body 142, a first tab 144 disposed at one end of the spring body 142, and a second tab 146 disposed at the other end of the spring body 142. The spring body 142 is a flat cable or strap wound in a spiral shape. The clock spring 114 may be formed (e.g., molded, casted, forged, and/or machined) from rubber, plastic, and/or metal. The first and second tabs 144 and 146 may be formed integrally with the spring body 142. Alternatively, the first and second tabs 144 and 146 may be formed separate from the spring body 142 and attached (e.g., fastened) thereto.

The inner housing 126 includes an annular body 148, an annular flange 150 disposed at one end of the annular body 148, a disk 152 disposed at the other end of the annular body 148, and a plurality of teeth 154 (FIG. 11) projecting from a backside 155 of the disk 152. The annular body 148 defines an elongated slot 156 that extends completely through the annular body 148. The lower front tether 104 is attached to the annular body 148 of the inner housing 126 using a fastener 158 (e.g., a rivet or screw). The disk 152 defines a hole 160 that extends though the center of the disk 152.

The spring restraint 116 includes a flat, elongated body 162 and a pawl 164 projecting from one end of the elongated body 162. The pawl 164 is configured to engage the teeth 154 on the backside 155 of the inner housing 126. For example, the shape of the pawl 164 may complement or match the shape of teeth 154. The spring restraint 116 and the inner housing 126, or the pawl 164 on the spring restraint 116 and the teeth 154 on the backside 155 of the outer housing 130, may be collectively referred to as a ratchet mechanism. The elongated body 162 of the spring restraint 166 defines a circular hole 165 and an elongated slot 166 that extend through the elongated body 162. The hole 165 is disposed adjacent to the end of the elongated body 162 from which the pawl 164 projects, and the elongated slot 166 is disposed adjacent to the other end of the elongated body 162.

The spring restraint 116 is pivotally mounted to the outer housing 130 using a fastener 167 (e.g., a rivet or screw) that is inserted through the hole 165 in the elongated body 162 of the spring restraint 116. The second end 122 of the triggering tether 118 is routed through the elongated slot 166 in the spring restraint 116 to form a loop and is joined to another portion of the triggering tether 118 using stitches 168. In turn, the second end 122 of the triggering tether 118 is attached to the spring restraint 116.

The coil spring 128 urges the pawl 164 of the spring restraint 116 into engagement with one of the teeth 154 on the backside 155 of the inner housing 126. The coil spring 128 includes a helical body 170, a first hook 172 projecting from one end of the helical body 170, and a second hook 174 projecting from the other end of the helical body 170. The first hook 172 attaches the coil spring 128 to the spring restraint 116. The second hook 174 attaches the coil spring 128 to the outer housing 130.

The outer housing 130 includes an annular body 176 and a disk 178. The annular body 176 defines an elongated slot 180 that extends through the annular body 176. The lower front tether 104 extends through the elongated slot 180 in the outer housing 130 when the tensioning mechanism 106 is assembled. The disk 152 defines a first circular hole 182 that extends though the center of the disk 152, and a second circular hole 184 that is offset from the center of the disk 152. The fastener 167 is inserted through the second circular hole 184 to attach the spring restraint 116 to the outer housing 130. The spring restraint 116, the inner housing 126, and the outer housing 130 may be formed (e.g., molded, casted, forged, and/or machined) from plastic and/or metal.

To assemble the tensioning mechanism 106, the first tab 144 of the clock spring 114 is inserted through the elongated slot 140 in the spindle 124, and the second tab 146 of the clock spring 114 is inserted through the elongated slot 156 in the inner housing 126. Then, the inner housing 126 is rotatably mounted to the spindle 124 by inserting a portion of the disk 152 surrounding the hole 160 in the second annular groove 136 in the spindle 124. The inner housing 126 may be attached to the second annular groove 136 in the spindle 124 via a clearance fit that allows the inner housing 126 to rotate relative to the spindle 124. When the inner housing 126 is attached to the spindle 124, the clock spring 114 is disposed within the inner housing 126.

The spring restraint 116 is attached to the outer housing 130 by inserting the fastener 167 through the hole 165 in the spring restraint 116 and the hole 184 in the outer housing 130. The outer housing 130 may include internal threads (not shown) disposed within the hole 184 that engage external threads on the fastener 167. When the spring restraint 116 is attached to the outer housing 130, the coil spring 28 may be disposed between the spring restraint 116 and the outer housing 130. Alternatively, the coil spring 128 may be disposed about the shank of the fastener 167 and disposed between the head of the fastener 167 and the spring restraint 160. The triggering tether 118 may be routed through the elongated slot 180 in the outer housing 130 and attached to the spring restraint 116 before the spring restraint 116 is attached to the outer housing 130.

The outer housing 130, with the spring restraint 116 attached thereto, is assembled over the inner housing 126 and mounted to the spindle 124 by inserting a portion of the disk 178 surrounding the hole 182 in the third annular groove 138 in the spindle 124. The outer housing 130 may be attached to the third annular groove 138 in the spindle 124 via a snap fit that prevents the outer housing 130 from rotating relative to the spindle 124. As the outer housing 130 is assembled over the inner housing 126, tension may be applied to the triggering tether 118 to counteract the biasing force of the coil spring 128 so that the pawl 164 does not interfere with the teeth 154 on the backside 155 of the outer housing 130. The lower front tether 104 may be routed through the elongated slot 180 in the outer housing 130 and attached to the inner housing 126 before the outer housing 130 is assembled over the inner housing 126 and mounted to the spindle 124.

Once the outer housing 130 is assembled over the inner housing 126 and mounted to the spindle 124, the tension applied to the triggering tether 118 may be released so that the pawl 164 engages one of the teeth 154 on the backside 155 of the outer housing 130. The tensioning mechanism 106 is then fully assembled. The tensioning mechanism 106 may be attached to the A-pillar 36 by inserting the spindle 124 into a hole (not shown) in the A-pillar 36 so that a portion of the A-pillar 36 surrounding the hole is disposed within the first annular groove 134 on the spindle 124. The A-pillar 36 may be attached to the first annular groove 134 in the spindle 124 via a snap fit that prevents the spindle 124 from rotating relative to the A-pillar 36.

Referring now to FIGS. 7-12, operation of example implementation of the tensioning mechanism 106 shown in FIGS. 10 and 11 will now be described. When the airbag cushion 12 is deployed as shown in FIG. 8, the airbag cushion 12 applies tension to the upper front tether 106, which applies tension to the triggering tether 118. In turn, the triggering tether 118 rotates the spring restraint 116 about the fastener 167 and thereby disengages the pawl 164 on the spring restraint 116 from the teeth 154 on the backside 155 of the inner housing 126. As a result, the clock spring 114 is allowed to unwind, which causes the inner housing 126 to rotate relative to the outer housing 130 in a direction that reels in or winds the lower front tether 104 around the inner housing 126. Consequently, the clock spring 114 applies tension to the lower front tether 104 and removes slack (or reels in slack) in the lower front tether 104.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

When a first element or layer is referred to as being "on," "engaged to," "connected to," or "coupled to" a second element or layer, it may be directly on, engaged, connected or coupled to the other element or layer, or intervening elements or layers may be present between the first and second elements or layers. In contrast, when a first element is referred to as being "directly on," "directly engaged to," "directly connected to," or "directly coupled to" a second element or layer, there may be no intervening elements or layers present between the first and second elements or layers. Other words used to describe the relationship between elements should be interpreted in a like fashion (e.g., "between" versus "directly between," "adjacent" versus "directly adjacent," etc.).

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatial and functional relationships between elements (for example, between modules, circuit elements, semiconductor layers, etc.) are described using various terms, including "connected," "engaged," "coupled," "adjacent," "next to," "on top of," "above," "below," "forward of," "rearward of," and "disposed." Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "and/or" includes any and all combinations of one or more of the associated listed items. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. An airbag assembly comprising:
   an airbag cushion configured to be stored in a roof of a vehicle when the airbag cushion is uninflated and configured to at least partially cover an opening in a sidewall of the vehicle when the airbag cushion is inflated;
   a first tether coupled to a forward edge of the airbag cushion at a first location and configured to be coupled to a body of the vehicle at a second location, wherein a length of the first tether between the first and second locations is configured to vary as the airbag cushion is deployed;

a tensioning mechanism that applies tension to the first tether and thereby removes slack from the first tether as the airbag cushion is deployed, wherein the tensioning mechanism attaches the first tether to an A-pillar of the vehicle at the second location; and a second tether attached to the forward edge of the airbag cushion at a third location and attached to the A-pillar at a fourth location, wherein the third and fourth locations are higher than the first and second location, and the fourth location is rearward of the second location.

2. The airbag assembly of claim 1 wherein a length of the second tether between the third and fourth locations is fixed.

3. The airbag assembly of claim 1 wherein the tensioning mechanism includes:
a clock spring coupling the first tether to the A-pillar at the second location;
a spring restraint configured to constrain the clock spring to prevent the clock spring from unwinding; and
a third tether coupling the second tether to the spring restraint, wherein when the airbag cushion is deployed, the airbag cushion pulls the second tether rearward, which pulls the third tether rearward and thereby releases the spring restraint, which allows the clock spring to unwind and thereby applies tension to the first tether.

4. The airbag assembly of claim 1 wherein the first tether is configured to remain taught as the length of the first tether between the first and second location varies.

5. The airbag assembly of claim 1 wherein the length of the first tether between the first and second location decreases as the airbag cushion is deployed.

6. The airbag assembly of claim 1 wherein the first location is adjacent to a lower edge of the airbag cushion, and the second location is on the A-pillar of the vehicle.

7. The airbag assembly of claim 6 further comprising a first spool attached to the A-pillar of the vehicle at the second location, wherein:
the first tether has a first end attached to the lower edge of the airbag cushion at a fifth location and a second end attached to the forward edge of the airbag cushion at the first location; and
the first tether extends from the lower edge of the airbag cushion to the A-pillar, extends along the A-pillar and at least partially around the first spool, and extends from the first spool to the forward edge of the airbag cushion.

8. The airbag assembly of claim 7 wherein the first tether includes a first segment, a second segment, and a third segment, the first segment extending between the A-pillar and the lower edge of the airbag cushion, the second segment extending along the A-pillar between the first and third segments, the third segment extending between the first spool and the forward edge of the airbag cushion.

9. The airbag assembly of claim 8 wherein, when the airbag cushion is deployed, the airbag cushion exerts a downward force on the first segment of the first tether, which in turn exerts a rearward force on the second segment of the first tether and a forward force on the third segment of the first tether.

10. The airbag assembly of claim 8 wherein the first segment of the first tether extends vertically along a B-pillar of the vehicle when the airbag cushion is inflated.

11. The airbag assembly of claim 8 further comprising a second spool attached to the A-pillar at a sixth location that is rearward of the second location, wherein the first segment of the first tether extends along the forward edge of the airbag cushion between the second spool and the lower edge of the airbag cushion, and the second segment of the first tether extends along the A-pillar between the first and second spools.

12. The airbag assembly of claim 11 further comprising a plurality of guides attached to the airbag cushion along the forward edge of the airbag cushion, wherein the first segment of the first tether passes through the plurality of guides.

13. An airbag assembly comprising:
an airbag cushion configured to be stored in a roof of a vehicle when the airbag cushion is uninflated and configured to at least partially cover an opening in a sidewall of the vehicle when the airbag cushion is inflated;
a first tether coupled to a forward edge of the airbag cushion at a first location and configured to be coupled to a body of the vehicle at a second location, wherein:
a length of the first tether between the first and second locations is configured to vary as the airbag cushion is deployed; and
the first location is adjacent to a lower edge of the airbag cushion, and the second location is on an A-pillar of the vehicle;
a first spool attached to the A-pillar of the vehicle at the second location, wherein:
the first tether has a first end attached to the lower edge of the airbag cushion at a third location and a second end attached to the forward edge of the airbag cushion at the first location; and
the first tether extends from the lower edge of the airbag cushion to the A-pillar, extends along the A-pillar and at least partially around the first spool, and extends from the first spool to the forward edge of the airbag cushion; and
the first tether includes a first segment, a second segment, and a third segment, the first segment extending between the A-pillar and the lower edge of the airbag cushion, the second segment extending along the A-pillar between the first and third segments, the third segment extending between the first spool and the forward edge of the airbag cushion;
a second spool attached to the A-pillar at a fourth location that is rearward of the second location, wherein the first segment of the first tether extends along the forward edge of the airbag cushion between the second spool and the lower edge of the airbag cushion, and the second segment of the first tether extends along the A-pillar between the first and second spools;
a second tether; and
a third spool, wherein the third spool is attached to the A-pillar at a fifth location that is rearward of the fourth location, and the second tether extends from the lower edge of the airbag cushion to the third spool, extends at least partially around the third spool, and extends from the third spool to the forward edge of the airbag cushion.

14. The airbag assembly of claim 13 further comprising a plurality of guides attached to the airbag cushion at locations along a B-pillar of the vehicle when the airbag cushion is inflated, wherein the second tether passes through the plurality of guides.

15. An airbag assembly comprising:
- an airbag cushion configured to be stored in a roof of a vehicle when the airbag cushion is uninflated and configured to at least partially cover an opening in a sidewall of the vehicle when the airbag cushion is inflated;
- a first tether coupled to a forward edge of the airbag cushion at a first location and configured to be coupled to a body of the vehicle at a second location, wherein a length of the first tether between the first and second locations is configured to vary as the airbag cushion is deployed; and
- a tensioning mechanism that includes:
  - a spring that applies tension to the first tether and thereby removes slack from the first tether as the airbag cushion is deployed, wherein the spring is a clock spring that couples the first tether to an A-pillar of vehicle at the second location;
  - a spring restraint configured to constrain the clock spring to prevent the clock spring from unwinding; and
  - a second tether having a first end coupled to the forward edge of the airbag cushion and a second end attached to the spring restraint, wherein when the airbag cushion is deployed, the airbag cushion pulls the second tether rearward and thereby releases the spring restraint, which allows the clock spring to unwind and thereby applies tension to the first tether.

16. The airbag assembly of claim 15 further comprising a third tether coupling the first end of the second tether to the forward edge of the airbag cushion.

17. The airbag assembly of claim 16 wherein:
- the third tether has a first end attached to the forward edge of the airbag cushion and a second end attached to the A-pillar; and
- the first end of the second tether is attached to the third tether at a location between the first and second ends of the third tether.

* * * * *